United States Patent
Breen, III et al.

(10) Patent No.: US 8,271,819 B2
(45) Date of Patent: Sep. 18, 2012

(54) METHODS AND SYSTEMS FOR INITIATING POWER TO AN INFORMATION HANDLING SYSTEM

(75) Inventors: John J. Breen, III, Harker Heights, TX (US); Scott Michael Ramsey, Cedar Park, TX (US); Timothy Thompson, Austin, TX (US); Shiguo Luo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 611 days.

(21) Appl. No.: 12/416,101

(22) Filed: Mar. 31, 2009

(65) Prior Publication Data

US 2010/0250973 A1 Sep. 30, 2010

(51) Int. Cl.
*G06F 1/26* (2006.01)
*G06F 1/18* (2006.01)
*G06F 15/177* (2006.01)

(52) U.S. Cl. ........ 713/330; 713/300; 713/310; 713/320; 713/321; 713/322; 713/324; 713/340; 327/143; 361/88; 361/89; 361/90

(58) Field of Classification Search .................. 713/300, 713/310, 320–324, 330, 340
See application file for complete search history.

(56) References Cited

U.S. PATENT DOCUMENTS

| 5,224,010 | A * | 6/1993 | Tran et al. ...................... 361/90 |
| 6,333,650 | B1 * | 12/2001 | Amin et al. .................... 327/143 |
| 6,603,221 | B1 | 8/2003 | Liu |
| 6,792,553 | B2 * | 9/2004 | Mar et al. ...................... 713/330 |
| 2005/0063113 | A1 * | 3/2005 | Ogawa ............................ 361/57 |
| 2008/0249666 | A1 * | 10/2008 | Buterbaugh et al. .......... 700/293 |
| 2008/0265683 | A1 | 10/2008 | Zhu et al. |

* cited by examiner

*Primary Examiner* — Fahmida Rahman
(74) *Attorney, Agent, or Firm* — Baker Botts L.L.P.

(57) ABSTRACT

An information handling system (IHS) is disclosed providing a power supply operable to provide an output current to the IHS during power initiation. The IHS may also include a first power component associated with a first power stage wherein the first power stage may have a first current threshold. Furthermore, the IHS may include a power control logic coupled to the power supply and the first power component. As such, the power control logic may be operable to communicate the first power stage to the power supply, and if the output current does not exceed the first current threshold during the first power stage, the power control logic may be operable to communicate a second power stage having a second current threshold to the power supply.

16 Claims, 3 Drawing Sheets

METHODS AND SYSTEMS FOR INITIATING POWER TO AN INFORMATION HANDLING SYSTEM

TECHNICAL FIELD

The present disclosure relates generally to the field of information handling systems (IHS), and more specifically, to methods and systems for providing power to an IHS.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A power supply may exist to supply power to the IHS and its requisite components. In addition, different components within the IHS may have different power and/or voltage requirements. Thus, voltage regulators, or more generally, power components may be employed to regulate each component and/or groups of components depending on their respective power requirements. In effect, power components may convert the voltage supplied by the power supply into a different, usually lower voltage usable by their associated devices.

In certain instances, a power component may fail and cause a short circuit, which may cause a large overcurrent in the IHS. For example, a voltage regulator may fail when one of its components, such as a metal-oxide semiconductor field effect transistor (MOSFET) malfunctions and becomes a short circuit. Furthermore, because modern power supplies may provide relatively large amounts of power, a short circuit in the IHS may result in overheating from too much current, thereby irreparably damaging IHS components.

Conventional power supplies may provide certain failsafe mechanisms in the event of a power component failure. For example, a power supply may provide overcurrent protection during the operation of the IHS under relatively high load conditions (i.e., periods of time where the IHS consumes a relatively high amount of current). Thus, if a failure in a power component creates a short circuit and/or overcurrent, the power supply may detect this condition and switch itself to an OFF state.

However, when the IHS is next powered back on during power initiation, though an overcurrent through the failed power component may exist, this overcurrent may not be detected by the power supply. This is because during power initiation, the power components may be successively switched to an ON state, one after the other. Thus, during power initiation, the current draw of the IHS does not reach its full potential until all its power components and devices have powered on. As a result, the overcurrent protection in the power supply, which may be designed for relatively high load conditions, may not be able to detect an overcurrent through a particular failed power component during power initiation. In other words, even though an overcurrent may exist through the failed power component, such overcurrent may not be high enough to trigger the overcurrent protection.

Thus, systems and methods are needed to provide multiple power stages with different current thresholds for different power components during power initiation such that overcurrent through certain power components may be detected.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for an information handling system (IHS). The IHS includes a power supply operable to provide an output current to the IHS during power initiation and a first component associated with a first power stage. The first power stage may have a first current threshold. Furthermore, the IHS may include a power control logic coupled to the power supply and the first power component. As such, the power control logic may be operable to communicate the first power stage to the power supply, and if the output current does not exceed the first current threshold during the first power stage, the power control logic may be operable to communicate a second power stage having a second current threshold to the power supply.

Another aspect of the present disclosure provides for a method for providing power to an information handling system (IHS). The method may include communicating a first power stage to a power supply coupled to the IHS. Additionally, the first power stage may have a first current threshold. The method may also include switching a first power component of the IHS to an ON state during the first power stage and switching the power supply to an OFF state if the output current exceeds the first current threshold during the first power stage. Furthermore, the method may include communicating a second power stage to the power supply if the output current does not exceed the first current threshold during the first power stage. To this end, the second power stage may have a second current threshold Yet another aspect of the present disclosure provides for a method for initiating power to an information handling system (IHS). The method may include communicating a first power stage having a first current threshold to a power supply. The power supply may be operable to provide an output current to the IHS. Furthermore, the method may include switching a first power component of the IHS to an ON state during the first power stage and also switching the first power component to an OFF state if the output current exceeds the first current threshold during the first power stage. Additionally, the method may include communicating a second power stage to the power supply if the output current does not exceed the first current threshold during the first power stage.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
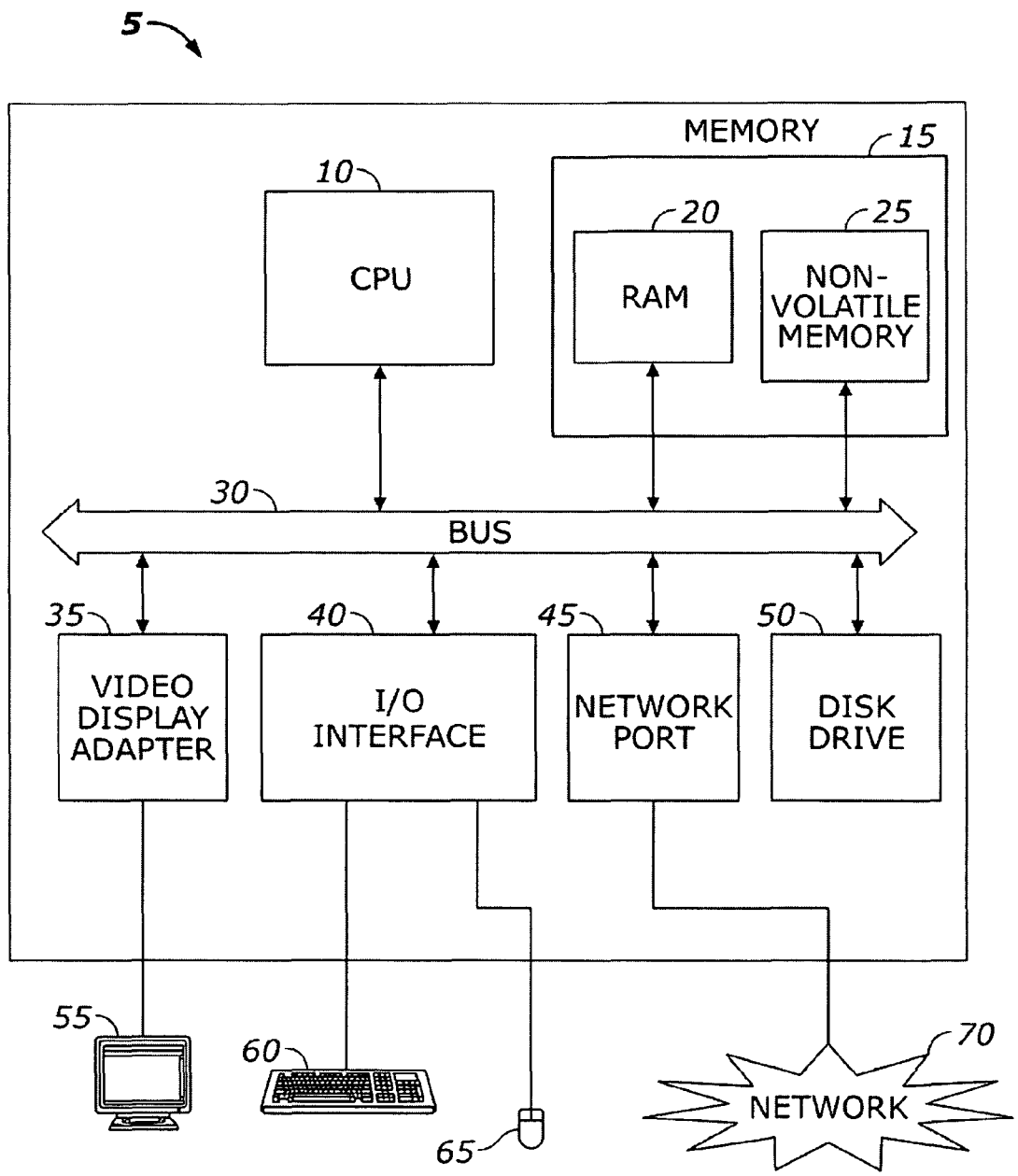
FIG. 1 represents an information handling system (IHS) in accordance with one aspect of the present disclosure.

Before the present systems and methods are described, it is to be understood that this disclosure is not limited to the particular systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

It must also be noted that as used herein and in the appended claims, the singular forms "a," "and," and "the" may include plural referents unless the context clearly dictates otherwise. Thus, for example, reference to "a power supply" refers to one or several power supplies and reference to "a method of initiating" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The system memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The system memory 15 may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
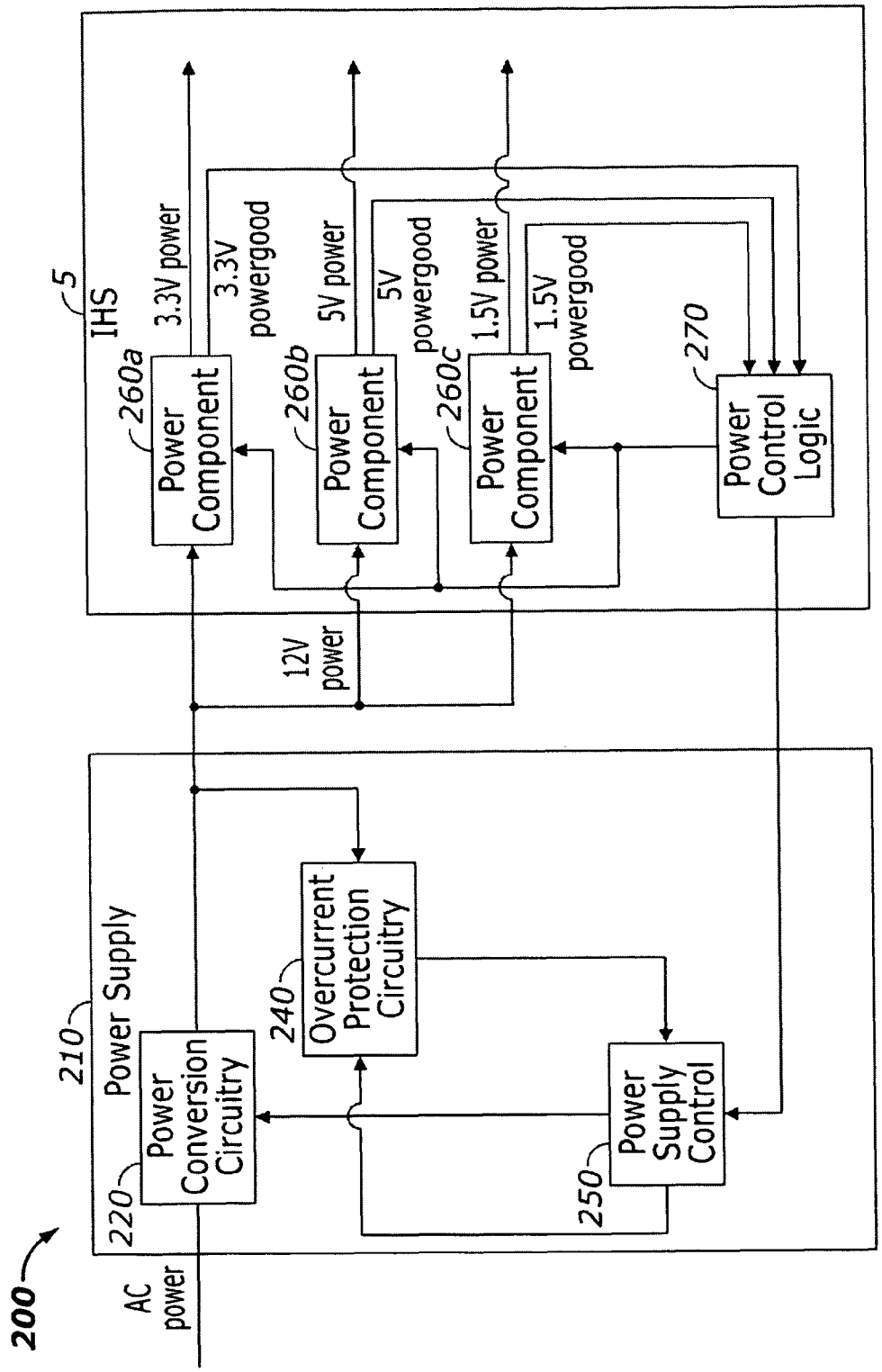
FIG. 2 represents a power management framework for initiating power to an IHS in accordance with one aspect of the present invention.

FIG. 2 represents a schematic illustrating a power management framework 200 for initiating power to an IHS 5 in accordance with one aspect of the present invention. The power management framework 200 may include a power supply 210. In general, a power supply may be any device or system configured to supply electrical energy to an output load, i.e., another device or system. As depicted in FIG. 2 the power supply 210 may be operable to provide an output current to the IHS 5 as well as provide a constant output voltage to the IHS 5. In one implementation, the power supply 210 may be operable to provide a constant output of 12 volts to the IHS 5.

Furthermore, the power supply 210 may also include power conversion circuitry 220 to convert an alternating current (AC) voltage source into to a direct current (DC) voltage output. For example, through the power conversion circuitry 220, the power supply 210 may be operable to receive AC voltage from an electrical outlet, such as from a wall, and convert it to a DC voltage. Additionally, the power conversion circuitry 220 may be further operable to convert the DC voltage into another (typically different) DC voltage, such as 12 volts for example, for consumption by the IHS 5. It should be noted that methods by which AC-DC and DC-DC conversions are performed are well known and would therefore be understood by one of ordinary skill in the art.

FIG. 2 also depicts an IHS 5, which may include power components 260a-n to receive the DC voltage output by the power supply 210. In some implementations, power components 260a-n may be referred to as voltage regulators or may refer to any parts of a voltage regulator. In addition, each power component 260a-n may provide power to one or more associated devices. To this end, power components 260a-n may be operable to convert the output voltage of the power supply 210 to a different voltage depending on the power requirements of their respective associated devices. As such, different devices may have different power requirements and may therefore be associated with a power component 260a-n as appropriate.

For example, a first power component 260a may convert the output voltage of the power supply 210 (e.g., 12 volts) to 3.3 volts for its associated devices. As non-limiting examples, such devices may include digital integrated circuits, clock integrated circuits, peripheral component interconnect (PCI) devices, complex programmable logic devices (CPLDs), and/or the like. Similarly, a second power component 260b may convert the output voltage of the power supply 210 to 5 volts for its own associated devices. Typical devices which may require a 5 volt input may include, but are not limited to, hard disk drives, optical drives, and Universal Serial Bus (USB) drives. Further still, a third power component 260c may convert the output voltage of the power supply 210 to 1.5 volts or its associated devices such as chipset silicon, processors, and dual in-line memory modules (DIMMs). Thus, depending on the power requirements of a device, the device may receive power from a particular power component 260a-n. Moreover, it should be noted that while FIG. 2 depicts three power components 260a-n, any number of power components 260a-n are contemplated within the present disclosure.

Additionally, the power supply 210 may also include an overcurrent protection circuit 240 coupled to the power conversion circuitry 220. An overcurrent may refer to any current through a conductor in excess of the amount the conductor is designed to withstand. Many causes of an overcurrent may exist including, but not limited to, a temporary spikes in current, a failure in certain devices within the IHS 5 such as a power component 260a-n, or a failure within the power supply 210 itself. For example, a failure in a power component 260a-n may cause a short circuit in the IHS 5. The short circuit may then create a large overcurrent through the failed power component 260a-n. and on through its associated devices Typically, an overcurrent in a conductor may result in the release of excess heat, which may damage the conductor as well as components coupled to the conductor. Thus, an overcurrent through a failed power component 260a-n may damage the power component 260a-n, its associated devices, and possibly other devices in the IHS 5 and/or power supply 210.

Therefore, the overcurrent protection circuitry 240 may create a feedback loop with the output of the power conversion circuitry 220 to monitor the output current of the power supply 210. As such, the overcurrent protection circuitry 240 may determine whether the output current exceeds a current threshold, which may be a predetermined value provided by the power supply control 250. As used herein, a current threshold may refer to a predetermined level of current that if exceeded by the output current of the power supply 210, may cause the power supply to 210 to switch off. In the event that the output current does in fact exceed the current threshold, the overcurrent protection circuitry 240 may switch the power supply 210 to an "OFF state". Additionally, the monitoring of the output current via the overcurrent protection circuitry 240 may be a continuous process while the power supply 210 is switched to an "ON" state, i.e., providing output current to the IHS 5.

The power supply control 250 may be coupled to the overcurrent protection circuitry 240 and the power conversion circuitry 220. Furthermore the power supply control 250 may be operable to control the power output of the power supply 210. For example, as previously mentioned, the power supply control 250 may provide a current threshold for the output current of the power supply 210. As such, the overcurrent protection circuitry 240 may monitor the output current with respect to this current threshold and switch the power supply 210 to an OFF state is the current threshold (is exceeded.

It may be important to note that conventional overcurrent protection schemes may employ a single current threshold designed to provide a limit on the output current of the power supply 210 during high load conditions (i.e., conditions under which the IHS 5 draws a high amount current from the power supply 210). Having only a single current threshold designed for a high load condition, however, may not take into account the possibility of overcurrent in individual devices. For instance, a device may experience an overcurrent through a short circuit in a failed power component 260a-n despite the total output current of the power supply 210 not exceeding the single current threshold. Thus, because the single current threshold may be designed to limit the current draw of the entire IHS 5 during a high load condition, the overcurrent through the individual device may be less than the current threshold. Thus, the overcurrent may remain undetected and cause irreparable damage to the device as well as other coupled devices.

Therefore, FIG. 2 may provide a power management framework 200 that may employ multiple power stages that have different current thresholds rather than using only a single current threshold for the entire system. A power stage may refer to a designated period of time during power initiation that provides its own distinct current threshold for the power supply. Furthermore, each power stage may be associated with different power components 260a-n such that each power component 260a-n is switched to an ON state during its respective power stage. Therefore, each power component 260a-n may be subject to its power stage's current threshold during power initiation.

In one implementation, each power stage may be introduced in succession to the power management framework 200 during power initiation to the IHS 5. As used herein, power initiation may refer to "powering up" the IHS by switching the power supply to an ON state. For example, while initiating power to the IHS 5, the power management framework 200 may enter a first power stage during which time a first power component 260a-n may be switched to an ON state. Furthermore, during the first power stage, the output current of the power supply may be limited by a first current threshold. If the first power component 260a-n successfully switches on, (i.e., no overcurrent and no failures are detected in the power component 260a-n, the details of which are discussed below) the power management framework 300 may enter a second power stage. As such, a second current threshold may be implemented while a second power component 260a-n switches to an ON state. Thus, different devices, which may be subject to overcurrent under different conditions, may each have an appropriate associated current threshold though their respective power components 260a-n.

To this end, a power control logic 270 may be in communication with the power components 260a-n and the power supply control 250 to inform the power supply control 250 of a particular power stage. The power control logic 270 may also inform the power supply control 250 of a current threshold associated with the power stage, or alternatively, the power supply control 250 may know to implement the current threshold based on the power stage. In one implementation, the power control logic 270 may be located within the IHS 5 and/or embedded on a motherboard. In addition, communication between the power control logic 270 and the power supply control 250 may be enabled via various means including, but not limited to, general purpose input/output (GPIO) bits, and/or a Power Management Bus (PMBus).

As previously mentioned, the power stages may be communicated from the IHS 5 to the power supply 210 during power initiation to the IHS 5. As such, during the power initiation process, the power control logic 270 may inform the power supply control 250 of a first power stage. After receiving communication indicating the first power stage, the power supply control 250 may then communicate a first current threshold to the overcurrent protection circuitry 240. Accordingly, the overcurrent protection circuitry 240 may continuously monitor the output current of the power supply 210 to account for whether the output current of the power supply 210 exceeds the first current threshold. As previously mentioned, in the event that the output current exceeds the first current threshold, the overcurrent circuitry 240 may inform the power supply control 250 of this occurrence, and the power supply control 250 may subsequently direct the power supply 210 to power off.

While the overcurrent protection circuitry 240 monitors the power supply's 210 output current during power initiation, the power control logic 270 may begin enabling (i.e., switching to an ON state) power components 260*a-n* associated with the first power stage. To this end, each power component 260*a-n* may check for any failures in its circuitry before switching to an ON state. Such failures may include defects in any part of the power component 260*a-n* including, but not limited to, metal-oxide-semiconductor field effect transistors (MOSFETs), capacitors, and/or any other circuit device. Since such failures may cause short circuits, open circuits, and/or the like, the power supply 210 may be switched off in the event of their occurrence. If a failure is not detected by the power component 260*a-n*, then a powergood signal may be asserted by the power component 260*a-n* to the power control logic 270.

As used herein, a powergood signal may be employed to indicate that the power component 260*a-n* is ready to function properly (i.e., there are no failures in the power component 260*a-n*). For example, when a power component 260*a-n* first initiates and begins receiving the output voltage of the power supply 210, circuitry within the power component may need time to begin operation before the power component 260*a-n* can generate its DC voltage (i.e., convert the output voltage of the power supply) at a stable level. During this time, the power component 260*a-n* may temporarily refrain from providing power to its associated devices. Thus, the power component's 260*a-n* associated devices may be prevented from receiving the necessary input voltage to initiate until the power component 260*a-n* can produce a stable DC voltage.

Once the power component 260*a-n* has achieved the required stability of its voltage output, it may assert a powergood signal and begin providing power to its associated devices. Afterwards, in the event that a power component 260*a-n* detects a failure during operation, the power component 260*a-n* may de-assert the powergood signal, thereby causing the power supply 210 to switch off. In some implementations, the powergood signal may be referred to as the Power OK signal and/or the PWR OK signal.

Once all the power components 260*a-n* that are associated with the first power stage have asserted a powergood signal, the power control logic 270 may next inform the power supply control 250 of a second power stage. The second power stage may have its own associated power components 260*a-n* and have a corresponding second current threshold. With respect to the second power stage, the power management framework 200 may operate in a similar manner as with the first power stage. That is, the output current of the power supply 210 may be monitored with respect to the second current threshold, and the associated power components 260*a-n* may have to assert a powergood signal before switching to an ON state.

In one implementation, the first power stage may be entered for a first power component that provides 12 volts to its associated devices. Such devices may include hard drive motors and certain fans within the IHS. During this first power stage, the current threshold may be set to 100 Watts. Subsequently, a second power stage may have an associated second power component that provides 5 volts. As previously mentioned, 5 volts may provide power to devices such as USB devices, hard drive logic, and floppy drive logic. For the second power stage, the second current threshold may be 150 W. Furthermore, additional power stages may have additional current thresholds associated with them.

It should be noted that the present disclosure is not limited to a particular number of power stages and/or current thresholds and that any number of power stages and/or current thresholds is contemplated. In some implementations, each subsequent power stage may have a higher current threshold (i.e., allow more output current from the power supply 210) than the previous power stage. Furthermore, a final power stage may be implemented after all the power components have switched to an ON state. To this end, the current threshold for the final power stage may be operable to provide a limit on the output current for the entire IHS 5 and all of its components. In other words, the last current threshold may provide a limit on the output current of the power supply 210 that accounts for maximum load conditions, such as is found within conventional power management frameworks. Notably, after communicating the last current threshold, power initiation to the IHS 5 may be considered successfully completed.

Figure 3:
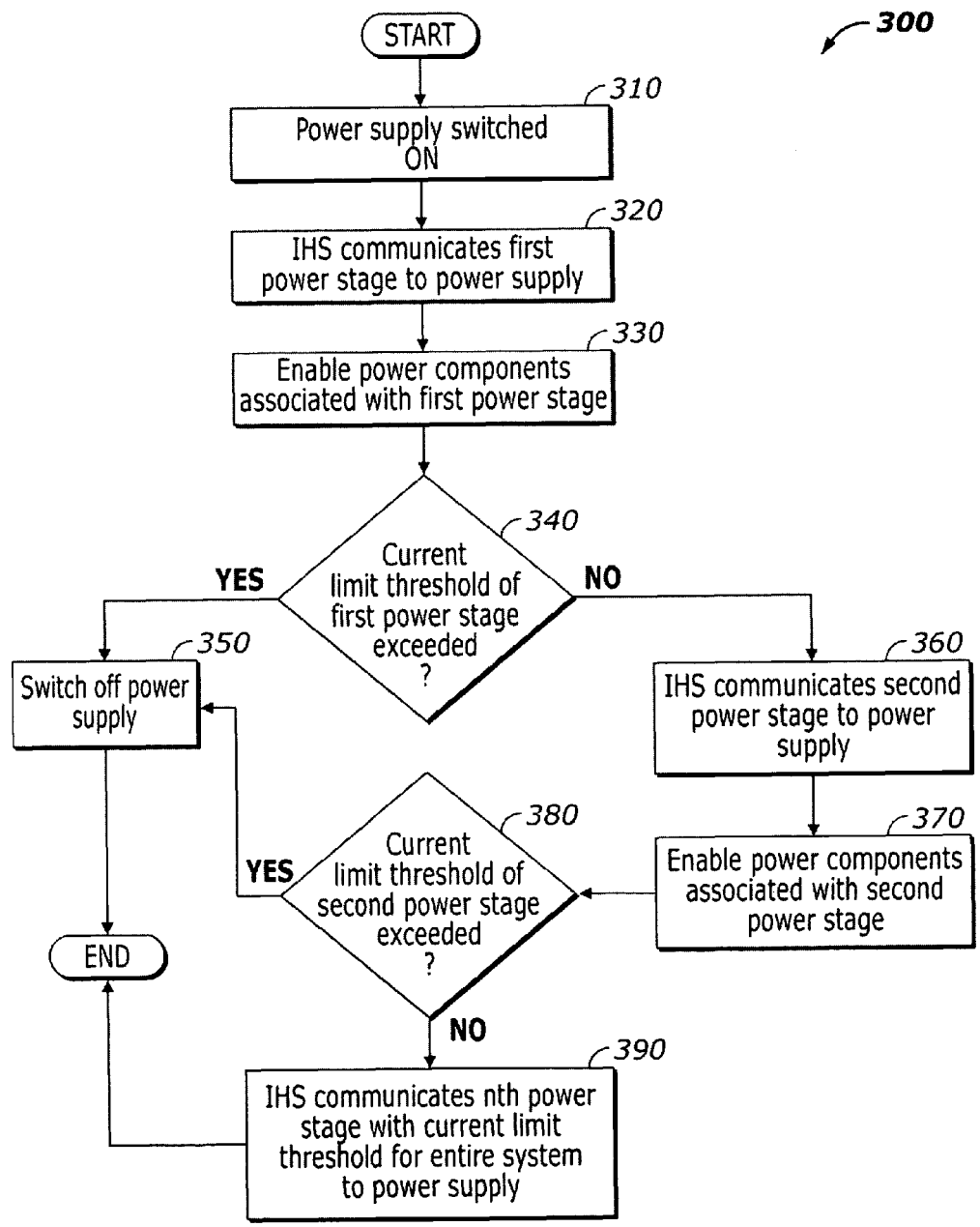
FIG. 3 provides a flow diagram illustrating a method for providing power to an IHS in accordance with one aspect of the present disclosure.

Turning now to FIG. 3, a flow diagram is provided that illustrates a method for providing power to an IHS indicated generally at 300. The method may begin in step 310, when a power supply may be switched to an ON state. Typically, this step may be performed by a user actuating a power button on the IHS, but any other means for switching on the power supply are also contemplated.

In step 320, the IHS may communicate a first power stage to the power supply. As previously mentioned in FIG. 2, a power control logic on the IHS may be in communication with a power supply control on the power supply to perform this step. Once the power stage has been indicated, power components in the IHS associated with the first power stage may be enabled (i.e., switched to an ON state) in step 330. As each power component is enabled successfully, it may provide a powergood signal to the IHS and/or power control logic. While, the power components associated with the first power stage are being enabled, the output current of the power supply may be monitored with respect to a first current threshold of the power stage in step 340. If at any time during the first power stage the output current exceeds the first current threshold, the power supply is switched to an OFF state to prevent damage to the power supply and the IHS.

If on the other hand, all the power components in the first power stage are enabled successfully (e.g., all provide powergood signals), the IHS may communicate a second power stage to the power stage in step 360. In 370, power components associated with the second power stage may be enabled. Similar to the first power stage, the second power stage may have a second current threshold that provides a ceiling on the output current of the power supply during the second power stage, indicated by step 380. If the output current exceeds the second current threshold during the second power stage, the power supply is switched to an OFF state in step 350.

Otherwise, in step 380 the IHS communicates the nth power stage to the power supply. The nth power stage may be the last power stage subsequent to the previously mentioned power stages, and therefore, the current threshold associated with the nth power stage may be configured to account for the load of the entire IHS. This may be in contrast to the previous power stage and/or stages whose respective current thresholds may be designed for their associated power components. In one implementation, each successive power stage may have a higher current threshold. For example, the second power stage may have a higher current threshold than the first power stage, and the last power stage may have a current threshold with the greatest ceiling.

It should be noted that while FIG. 3 illustrates at least three power stages, fewer power stage are also possible. For example, in one implementation, there may only exist a first power stage and a second power stage wherein the second power stage is the last power stage for the entire IHS. Thus, under the implementation, all the IHS power components may be subject to a current threshold associated with the first power stage. After all the power components have been successfully enabled, the IHS may communicate the second and last power stage.

Thus, methods and systems of the present disclosure may provide a power management framework to detect overcurrent resulting from individual power components in an IHS. To this end, the power management framework may provide multiple power stages and multiple associated current thresholds for the power components, respectively. As a result, overcurrent due to a failure in a power component may be detected before further damage may be caused to the IHS.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An information handling system (IHS) provided with overcurrent protection comprising:

a power supply operable to provide an output current to the IHS during power initiation, the power supply comprising overcurrent protection circuitry and a power supply control;

a first power component associated with a first power stage having a first current threshold; and a power control logic coupled to the power supply and the first power component, wherein the power control logic is operable during power initiation to communicate the first power stage and the first current threshold to the power supply via a Power Management Bus (PMBus), and wherein if the output current does not exceed the first current threshold during the first power stage, the power control logic is operable to communicate a second power stage having a second current threshold to the power supply, wherein the power supply control communicates the first current threshold to the overcurrent protection circuitry, and wherein the overcurrent protection circuitry is operable to indicate an overcurrent to the power supply control if the output current exceeds the first current threshold during the first power stage or exceeds the second current threshold during the second power stage.

2. The system of claim 1, wherein the first power component provides power when it has achieved a required stability of its voltage output.

3. The system of claim 1, wherein the power control logic is operable to switch the first power component to an ON state during the first power stage.

4. The system of claim 3, wherein the first power component is operable to provide a powergood signal to the power control logic when the first power component switches to the ON state.

5. The system of claim 4, wherein upon receiving the powergood signal from the first power component, the power control logic communicates the second power stage to the power supply.

6. The system of claim 1 further comprising a second power component associated with the second power stage.

7. The system of claim 1, wherein the power supply comprises:

the overcurrent protection circuitry operable to monitor the output current of the power supply; and the power supply control coupled to the overcurrent protection circuitry and the power control logic, the power supply control operable to switch the power supply between an ON state and an OFF state.

8. The system of claim 1, wherein the power supply control is operable to switch the power supply to an OFF state upon indication of the overcurrent by the overcurrent protection circuitry.

9. A method for providing power to an information handling system (IHS) provided with overcurrent protection, the method comprising:

communicating a first power stage to a power supply coupled to the IHS and providing an output current to the IHS, the first power stage having a first power supply current threshold;

switching a first power component of the IHS to an ON state during the first power stage when it has achieved a required stability of its voltage output;

switching the power supply to an OFF state if the power supply output current exceeds the first current threshold during the first power stage;

communicating a second power stage to the power supply if the power supply output current does not exceed the first current threshold during the first power stage, the second power stage having a second power supply current threshold; and communicating, by a power control logic, the first power stage, the first power supply current threshold, the second power stage, and the second power supply current threshold to a power supply control of the power supply via a Power Management Bus (PMBus).

10. The method of claim 9 further comprising switching the power supply to the OFF state if the output current exceeds the second power supply current threshold during the second power stage.

11. The method of claim 9 further comprising:
monitoring the output current of the power supply; and
switching the power supply between an ON state and the OFF state based on the output current of the power supply after the first power component has achieved the required stability of its voltage output.

12. The method of claim 9 further comprising indicating an overcurrent to the power supply control if the output current exceeds the first power supply current threshold during the first power stage or exceeds the second power supply current threshold during the second power stage.

13. The method of claim 12, wherein switching the power supply to the OFF state is performed by the power supply control upon indication of the overcurrent by overcurrent protection circuitry.

14. A method for initiating power to an information handling system (IHS) to provide overcurrent protection, the method comprising:

during power initiation communicating a first power stage and a first current threshold, the first current threshold is associated with the first power stage, to a power supply via a Power Management Bus (PMBus), the power supply operable to provide an output current to the IHS, the power supply comprising overcurrent protection circuitry and a power supply control;

switching a first power component of the IHS to an ON state during the first power stage;

switching the first power component to an OFF state if the output current exceeds the first current threshold during the first power stage; and communicating a second power stage to the power supply if the output current does not exceed the first current threshold during the first power stage, the second power stage associated with a second current threshold, wherein the power supply control communicates the first current threshold to the overcurrent protection circuitry, and wherein the overcurrent protection circuitry is operable to indicate an overcurrent to the power supply control if the output current exceeds the first current threshold during the first power stage or exceeds the second current threshold during the second power stage.

15. The method of claim 14, wherein communicating the first current threshold and communicating the second current threshold are performed by a power control logic coupled to the power supply.

16. The method of claim 14 further comprising switching the power supply to an OFF state if the output current exceeds the first current threshold during the first power stage.

* * * * *